United States Patent [19]

Staudinger

[11] 3,964,882

[45] June 22, 1976

[54] PARTIAL COMBUSTION PROCESS

[75] Inventor: Gernot Staudinger, Amsterdam, Netherlands

[73] Assignee: Shell Oil Company, Houston, Tex.

[22] Filed: Oct. 9, 1974

[21] Appl. No.: 513,207

[30] Foreign Application Priority Data
Oct. 19, 1973  Netherlands .................... 7314390

[52] U.S. Cl. .............................. 48/215; 48/197 R; 48/212; 252/373

[51] Int. Cl.² ..................... C10G 13/30; C10J 3/16; C10J 3/46; C10K 1/00

[58] Field of Search ............ 48/196, 197, 210, 212, 48/213, 214, 215, 206; 252/373

[56] References Cited
UNITED STATES PATENTS

| | | | |
|---|---|---|---|
| 2,684,896 | 7/1954 | Coghlan ............................... | 48/215 |
| 2,803,530 | 8/1957 | Lademan .............................. | 48/206 |
| 2,879,148 | 3/1959 | Atwell ........................... | 48/197 R X |
| 3,254,976 | 6/1966 | Wolf et al. .................... | 48/197 R X |
| 3,454,383 | 7/1969 | Pirsh et al. ............................ | 48/101 |
| 3,782,913 | 1/1974 | Donath ................................ | 48/202 |
| 3,847,566 | 11/1974 | Wilson .......................... | 48/197 R X |
| 3,853,498 | 12/1974 | Bailie ................................ | 48/197 R |
| 3,867,110 | 2/1975 | Schora et al. ...................... | 48/206 X |
| 3,868,331 | 2/1975 | Campagne ........................ | 48/215 X |

*Primary Examiner*—Morris O. Wolk
*Assistant Examiner*—Michael S. Marcus

[57] ABSTRACT

A partial combustion process wherein a substantial portion of the soot formed in the combustion reactor is separated from the crude gas, e.g., by hot cyclones, and burned in a separate combustion zone with an excess of oxygen, optionally in the presence of steam, to yield a hot gas containing oxygen, carbon dioxide and water. This hot gas product, dependent on the ash content of the hydrocarbon feed is then subject to an optional solids removal step prior to its introduction into the partial combustion reactor where the oxygen contained therein supplies at least a portion of the oxidant requirement for partial oxidation and the carbon dioxide and water present therein are substantially converted to carbon monoxide and hydrogen.

3 Claims, 2 Drawing Figures

PARTIAL COMBUSTION PROCESS

BACKGROUND OF THE INVENTION

The present invention relates to a process for the partial combustion of hydrocarbonaceous fuels to produce gases having a substantially reduced soot content.

In the chemical and energy providing industries there is a great demand for gas containing substantial amounts of hydrogen and/or carbon monoxide in various mixtures and purities. Such gas may be used, for instance, as a starting material for the manufacture of chemical products — e.g., ammonia, alcohols, etc., — as a reducing agent, as a clean fuel or in hydrogenation processes. A well-known and widely employed method for the preparation of such a gas is the partial combustion of hydrocarbonaceous fuels in a substantially void or hollow reactor. One of the attractive aspects of this process is its flexibility in the types of hydrocarbon fuels which can be converted to the desired gaseous products. Suitable hydrocarbonaceous fuels which may be subject to partial combustion in this non-catalytic process include normally gaseous and liquid hydrocarbons, e.g., middle distillates and light and heavy fuel oil, as well as liquid fuels mixed with solid carbon-containing particles such as the carbon soot typically obtained as a product of partial combustion. The combustion can be effected with oxygen, with air, or with air which has been enriched with oxygen. Frequently steam is added to the reaction mixture.

The gases produced by processes for partial combustion of hydrocarbonaceous fuels invariably contain a substantial amount of free carbon (i.e., soot) which is undesirable for the subsequent utilization or processing of the gases and which should therefore be removed. The removal of the soot is normally achieved by scrubbing the gases with water. The resulting dispersion of soot particles in water is then processed in order to recover substantially soot-free water and soot. The soot removal facilities are expensive and the recovered soot generally has a low value. Alternatively, the soot dispersion in water, or even the water-free soot, can be recycled to the partial combustion reactor for conversion to carbon monoxide. However, in these instances there are difficulties in the preparation of a suitable soot-containing feed for introduction into the reactor and more elaborate mixing devices and feed nozzles are required to ensure accurate control and adequate mixing of the soot-containing fuel on introduction into the reactor. Furthermore, in any event, the recycled soot is only partially converted to usable gas products due to the longer reaction times required for its conversion while at the same time causing an objectionable build-up of ash in the reactor itself and subsequent processing equipment in cases where residual fuels containing ash-forming components are employed as the fuel feed to partial combustion.

One of the primary means previously employed to optimize usable gas (hydrogen plus carbon monoxide) formation and minimize soot formation has been to optimize and accurately control the O/C ratio (atomic ratio of total oxygen to total carbon in the feed) which is introduced into the combustion reactor. With an O/C ratio of 1, hydrocarbons in the ideal case yield carbon monoxide and water. However, in actual practice, at this stoichiometric O/C ratio, significant quantities of soot are formed in addition to the desired product gases. By increasing the atomic ratio of O to C, the amount of soot formed may be reduced, but more carbon dioxide and water will be formed. If the O/C ratio is decreased, less carbon dioxide and water will be formed, but more soot will form and there will remain more uncombusted hydrocarbons. Other means such as adding steam to the combustion zone, preheating the reactants and the utilization of particular reaction zone designs and reactant mixing schemes are said to have a desirable effect on optimization of yield to usable gas and/or minimization of undesirable soot formation. However, despite all of these previous efforts, the soot formation is still significant enough to necessitate the use of elaborate gas purification schemes.

The present invention seeks to provide a more economic process wherein the soot formed on partial combustion is more effectively and efficiently converted to the desired gaseous products, the thermal efficiency of the overall process is materially increased and the water scrubbing of the partial combustion effluent with its associated problems to recover the by-product soot is substantially eliminated.

SUMMARY OF THE INVENTION

It has now been found that high yields of usable gas (hydrogen plus carbon monoxide) can be obtained in the conventional partial combustion of a hydrocarbonaceous fuel in a substantially void reaction zone with almost complete utilization of the fuel, including the carbon soot initially formed in partial combustion, if the crude gas product of partial combustion containing entrained particulate matter made up substantially of carbon soot is subject to a gas-solids separation via centrifugation and/or gravitation, e.g., in a hot cyclone, to remove a substantial portion of the soot and this separated soot is burned with an excess of oxygen in a separate combustion zone, optionally in the presence of steam, to yield a hot gas containing oxygen, carbon dioxide and water, which hot gas is then introduced into the partial combustion reactor. On introduction into the partial combustion reactor, the oxygen present in the hot gas product of soot combustion supplies at least a part of the oxygen required for partial combustion while the carbon dioxide and water present therein are substantially converted into carbon monoxide and hydrogen via reaction with the soot formed on partial combustion of the fuel. Thus, the thermal efficiency of the process is materially increased since the endothermic soot gasification reactions, i.e., reaction of soot with carbon dioxide and water, previously employed in conventional partial combustion processes to gasify soot recovered via water scrubbing of the partial combustion effluent are now substantially supplanted by the exothermic soot combustion reaction; the heat of which is recovered in the overall process by cycling the hot gas product of soot combustion into the partial combustion reactor. Furthermore, when residual fuels containing ashforming components are employed in the instant process, the build up of ash in the reaction and subsequent processing steps can be readily and simply avoided, even though the soot is completely recirculated, by merely subjecting the hot gas product of soot combustion to a gas-solids separation step, such as that utilized to separate the soot from the crude gas product of partial combustion, e.g., in a hot cyclone, prior to introduction of the hot gas into the partial combustion reactor. The several other advantages of the instant invention over conventional partial combustion processes will become apparent from the detailed description of the invention below.

Accordingly, in its broadest aspects the instant invention is directed to a process for the production of a substantially soot-free gaseous partial combustion product which comprises;

1. partially combusting a hydrocarbonaceous fuel in a substantially void combustion zone by reaction between said fuel and an oxygen-containing gas to yield a crude gas product containing principally hydrogen and carbon monoxide and a minor proportion of soot;
2. passing the crude gas product into a gas-solids separation zone wherein the solid soot particles are separated by centrifugation and/or gravitation thereby affording a substantially soot-free partial combustion gas product and a solids product consisting substantially of separated soot;
3. burning said separated soot with an excess of oxygen in a soot combustion zone to yield a hot combustion gas containing as principal components, oxygen, carbon dioxide and water and
4. passing the hot gas product from the soot combustion zone into the partial combustion zone whereby the oxygen contained therein supplies at least a part of the oxygen requirements for partial combustion and substantial portions of the carbon dioxide and water contained therein are converted to carbon monoxide and hydrogen.

THE DRAWING

The invention will be described in greater detail with reference to the accompanying drawing wherein FIGS. 1 and 2 are diagrammatic representations of two alternate process flow schemes according to the invention.

DETAILED DESCRIPTION OF THE INVENTION

Figure 1:
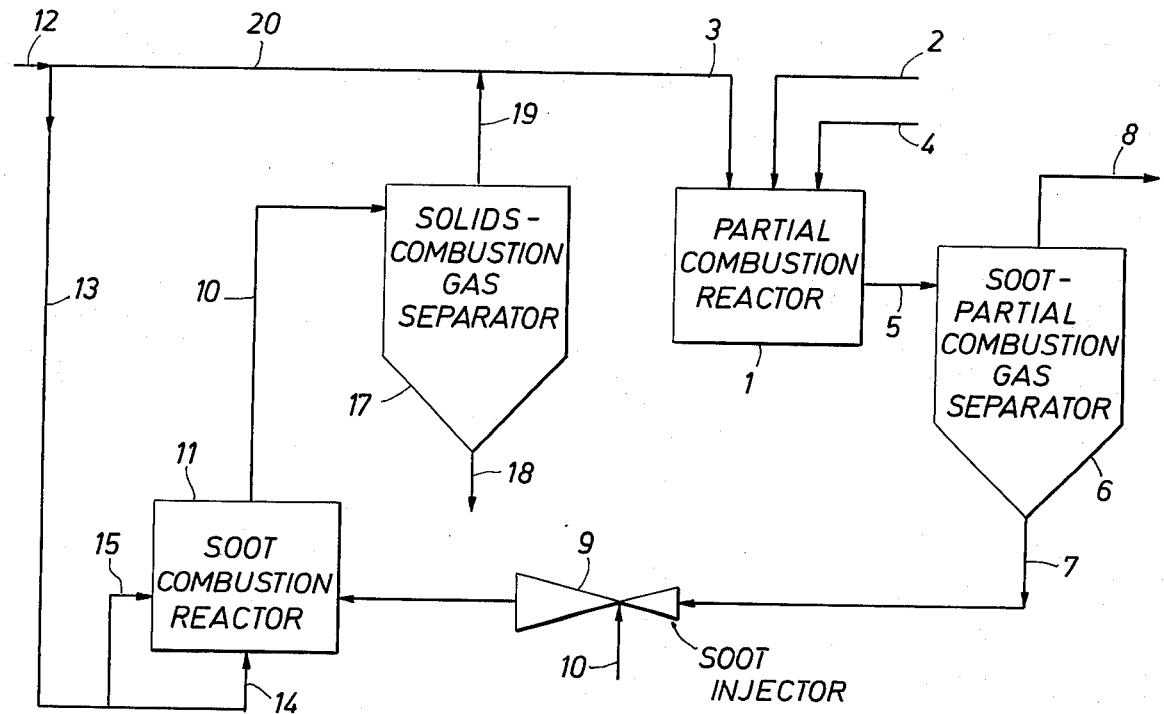

The first step of the process according to the invention involves a conventional partial combustion procedure wherein a hydrocarbonaceous fuel source is combined with less than the theoretical amount of oxygen present in an oxygen-containing gas at temperatures in excess of 1000° C in a substantially void combustion zone to yield a gaseous product containing as principal components, hydrogen and carbon monoxide and a minor, though significant, proportion of carbon soot.

The partial combustion step of the present invention can be suitably carried out using air, oxygen enriched air or oxygen as the oxidant source (oxygen-containing gas). In any case it is contemplated that the reaction will be conducted in a conventional manner under conditions of temperature and pressure such that the reaction is self-supporting. Accordingly, the reaction temperature, broadly stated, will range from about 700° to about 2000° C with the reaction pressures ranging from atmospheric up to about 600 psig. Within this broad range the reaction temperature and pressure are preferably 900°–1400° C and atmospheric to 30 psig, respectively, when air is used as the oxidant source with somewhat higher temperatures and pressures, e.g., 1100°–1700° C and atmospheric to 600 psig, being employed when oxygen is used as the source of oxygen-containing gas.

The hydrocarbonaceous fuels which are suitable for use in the process of the invention include any hydrocarbon-containing feed material which is capable of being made sufficiently fluid, i.e., by preheating and/or the addition of steam via conventional means to be injected by conventional nozzle devices into the partial combustion reactor. Natural gas or normally gaseous hydrocarbons such as $C_{2-4}$ saturated and olefinic hydrocarbons because of their availability and ease of handling are particularly suitable, however, heavier hydrocarbon fractions including gasoline, kerosene, naphtha, distillates, gas oils and residual oils can also be used as feed materials. In addition, such materials as coal distillation gas and the effluent from liquefaction or gasification of coal can also be suitably employed.

An apparatus suitable for carrying out the partial combustion step of the process of the invention may consist of a substantially void partial combustion reactor of any conventional design previously employed in such processes, e.g., substantially cylindrical or spherical in shape with an inlet nozzle/mixing device for introduction of the fuel, oxygen-containing gas and steam and a discharge conduit for removal of the reaction product. The gaseous product discharge of partial combustion may be subject to indirect heat exchange in, for example, a waste-heat boiler prior to further processing according to the invention.

One of the principal advantages of the process of the instant invention is that the formation of soot in larger amounts than can be tolarated by conventional processes, from yield and handling standpoints, is no longer objectionable. This, of course, is quite desirable especially in partial combustion processes where an expensive oxidant source such as substantially pure oxygen is employed since, as was previously pointed out, the oxygen/fuel ratio or O/C ratio has a great influence on the quantity of soot ultimately produced. Thus, with the instant process the amount of oxygen supplied to the partial combustion zone can be set at a level much closer to to the amount theoretically required by the stoichiometry of the reaction. Accordingly, in the process of the instant invention, the O/C ratio of the total oxygen-containing gas and hydrocarbonaceous fuel feedstock introduced into the partial combustion reaction zone may suitably vary between about 0.8 and 1.8 with ratios in the range of 0.8 to 1.2 being preferred. Since other reaction conditions, i.e,. residence time, reaction temperature, feed composition, etc., play a role in the extent of soot formation, the most preferred reaction conditions in the partial combustion step are best set with reference to the amount of feed converted to soot in the partial combustion zone. Within this context, most preferably, the conditions for the partial combustion in the reactor are chosen such that at least 5% and at most 15% of the feed is converted into soot. Compared to conventional partial combustion processes where for heavy hydrocarbonaceous feed about 1.0 $Nm^3$ oxygen per kg feed is needed, it is now possible to operate at 0.8 $Nm^3$ oxygen per kg feed. At this reduced oxygen to hydrocarbon feed ratio approximately 15% of the feed is converted into soot. With conventional partial combustion processes, efficient and effective plant operation is achieved when 3–5% of the feed is converted into soot. Since the instant process aims at complete recycle and extinction of soot, the presence of a relatively large amount of soot in the reactor is also desirable in that it promotes the conversion of $CO_2$ and $H_2O$ (contained in the hot gaseous product of soot combustion) into CO and $H_2$.

Certain benefits are also realized in the process when steam is introduced into admixture with either or both of the hydrocarbon fuel and/or oxygen-containing gas feedstock to the partial combustion reactor. Thus, in an optional embodiment of the invention, the oxygen-containing gas, the hydrocarbonaceous fuel or the oxygen-containing gas/hydrocarbonaceous fuel admixture may be mixed with steam on passage into the partial combustion reactor. Additionally, either or both of the hydrocarbonaceous fuel and oxygen-containing gas feed streams to partial combustion may be subject to preheating via external heat exchange prior to introduction into the partial combustion reactor.

The crude product gas which emanates from the substantially void partial combustion zone is made up principally of hydrogen and carbon monoxide and also contains a minor amount of entrained particulate matter, e.g., 5–15% based on the hydrocarbonaceous feed to the combustion zone, which is predominately carbon soot. This crude gas product, optionally after recovery of part of the heat contained therein, is passed to a gas-solids separation zone wherein all or substantially all of the entrained particulate matter, e.g., soot, is separated by means of centrifugal and/or gravitational action, e.g., in one or more cyclone separators, to yield a substantially soot-free product gas and a solids-containing phase consisting substantially of soot. Such gas-solids separation is wholly conventional, e.g., see U.S. Pat. No. 2,665,980 and need not be detailed herein. Preferably, the separation is effected hot, i.e., with little or no cooling of the crude gas product in order to optimize heat efficiency in the overall process scheme.

The soot thus separated can be transported to the soot combustion unit by various known means. However, preferably a gas flow is chosen for this purpose, which is a part of the flow of crude product gas leaving the partial combustion reactor. The desired components, carbon monoxde and hydrogen, present in this branched-off flow will be burned completely in the soot combustion zone, together with the soot, but the carbon dioxide and water formed will be converted in the partial combustion reactor, as mentioned above, and further detailed below.

The combustion of the separated soot is effected in the soot combustion zone by reaction with an excess of oxygen, so that all soot is converted into carbon dioxide. Thus, a combustion gas is formed which, in any case, contains carbon dioxide, oxygen and water and, in cases where air has been used as the oxygen source in the soot combustion zone, some nitrogen will also be present. This combustion gas has a high temperature. Without being cooled, it is passed to the reaction zone, where the partial combustion takes place. The oxygen thus introduced forms part of the oxygen needed for partial combustion of the hydrocarbonaceous fuel. In the reactor, carbon dioxide and water are wholly or largely converted into carbon monoxide and hydrogen. Thus, the soot is fully used for the preparation of the desired gases, so that no part of the hydrocarbonaceous feed is lost. An important feature is that any amount of soot can be recirculated in this way. Transportation and combustion of the soot do not present problems such as are encountered in conventional scrubbing of the crude gases utilized to recover the soot.

The fact that the heat generated in the soot combustion process is completely transferred back to the reactor is also of advantage, since the partial combustion reactor contents will thus remain at the highest temperature than can be reached under the prevailing circumstances and the heat generated in the exothermic soot combustion reaction will be conserved in the overall process. This aspect of the invention also aids in reducing the overall oxygen consumption in the process since the heat introduced into the partial combustion reaction zone via this hot gas product promotes the endothermic reactions in the partial combustion sequence and reduces the amount of heat release from combustion required to preheat the reaction zone contents to partial combustion reaction conditions thus allowing the oxygen charge to the reaction to be set closer to the theoretical stoichiometric amount.

In order to obviate the necessity of using a compressor for gas of a high temperature it is desirable that the pressure in the soot combustion zone be higher than that in the partial combustion reactor. The separated soot can then be fed into the combustion unit by means of a steam injector.

The excess of oxygen in the soot combustion zone suitably ranges between a twofold and a fivefold excess over that required for complete combustion of the soot. A part of the oxygen or the oxygen-containing gas can be introduced into the flame zone of the soot combustion unit. This will promote the complete combustion of the soot.

Depending on the hydrocarbonaceous feed utilized, the gas leaving the combustion unit may contain solid particles such as ash. For example, many residual fuels contain ash-forming components. In the instant invention the solid ash particles can be separated from the soot combustion gas via a gas-solids separation, e.g., by cyclone action, before this gas is passed to the partial combustion reactor. This comprises an additional advantage of the instant invention because when soot is separated from the raw product gas, ash particles and the like are separated at the same time. After the soot has been burned, the ash particles can be removed easily and no soot is lost in this process. The difficult separation of soot and ash in solid form is thereby avoided. Moreover, the ash particles are prevented from returning to the reactor and there is no build-up of ash in the process.

After passing the soot-separation cyclones, the product gas can in a later stage be given a water wash in conventional water scrubbing apparatus in order to remove small amounts of soot not separated from the gas by the cyclones employed in the gas-solids separation zone. The soot thus separated can still be fed to the combustion unit, for instance by introducing the soot-containing water into the crude partial combustion product gas before the gas-solids separation zone, e.g., soot-separation cyclones, so that the water will be evaporated and the recycled soot will then be amenable to separation with the cyclones in the gas-solids separation zone. During this cycle the very small soot particles will agglomerate to larger particles which can be separated by cyclone action.

The invention will now be elucidated with reference to the figures which schematically show two embodiments of the process according to the invention.

In FIG. 1 the substantially void reactor for the partial combustion is indicated by 1. To this reactor, feed 2, oxygen-containing gas 3 and steam 4 are passed. A flow of product gas 5 leaves the reactor at a high temperature. In a soot-partial combustion gas separator 6, typically comprising one or more cyclones, soot is separated as stream 7, from this crude gas and the wholly or largely soot-free gas leaves the separator as flow 8.

By means of a small branched-off flow of product gas the soot 7 is transported to a soot-injector 9, which, with the aid of steam 10 at a sufficiently high pressure, introduces the soot with the branched-off flow of product gas and the steam into the soot combustion reactor 11.

Oxygen or an oxygen-containing gas (air) is supplied at 12. A flow 13 branched off from this supply is passed to the soot combustion reactor 11. This flow is split up into a flow 14, which is introduced into the bottom section of the combustion reactor 11, and a flow 15, which is conducted into the flame zone of the combustion reactor. The combustion gas 16 flows to a solids-combustion gas separator 17, which is typically a cyclone for the removal of solid particles 18, mainly ash. The cleaned soot combustion gas 19, which contains a large amount of oxygen and also carbon dioxide, water and possibly nitrogen and which is at a high temperature, is then combined with the oxygen or oxygen-containing gas flow 20 to form the oxygen-containing gas flow 3.

Figure 2:
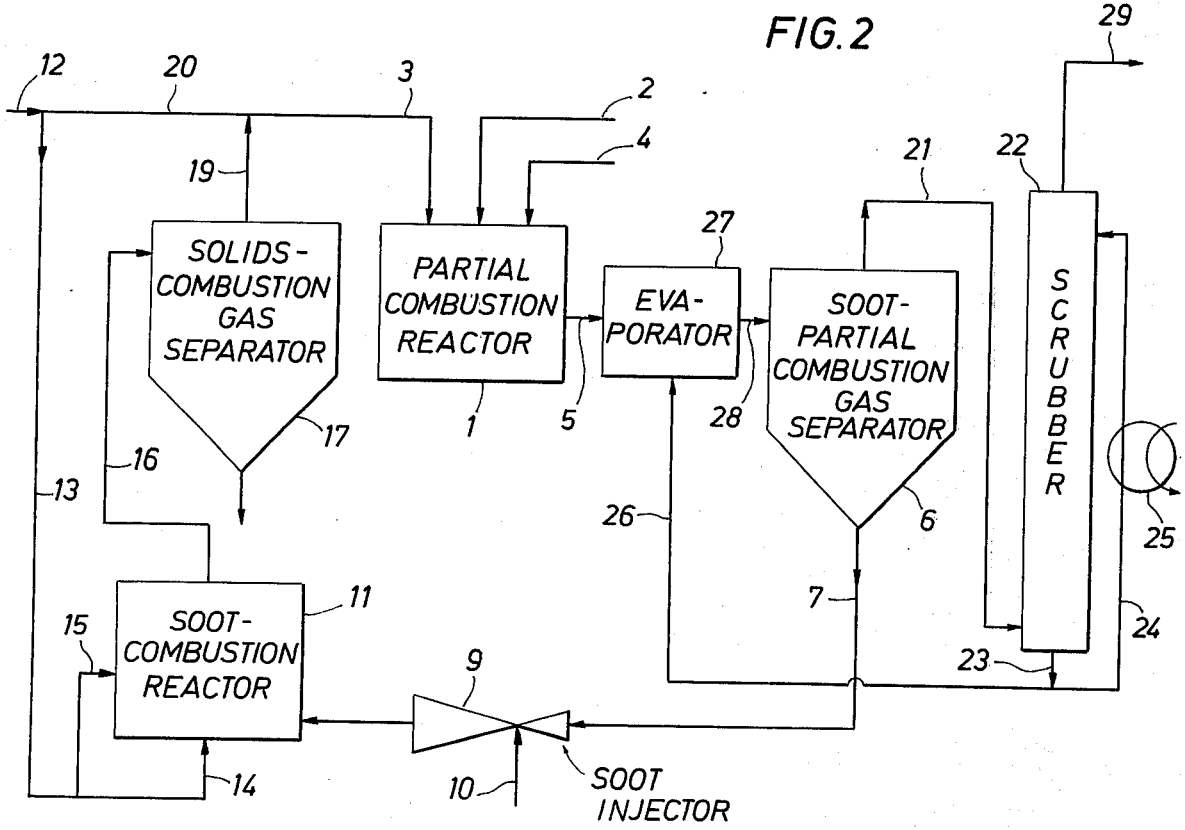

The numbers in FIG. 2 are identical to those in FIG. 1 have the same meaning as the latter.

The largely soot-free product gas 21 which leaves the soot-partial combustion gas separator 6 is conducted to a scrubber or washing unit 22, which may consist of a column with gas/liquid-contacting trays or of one or more venturis. The scrubber or washing unit 22 discharges a suspension 23 of particulate matter made up of soot and ash particles in water. A flow 24, branched off from this discharge flow returns via a cooler 25 to the scrubber 22, with the other part of the discharge flow, 26, going to the evaporator 27. The latter may be a venturi. The heat content of the gas 5 is partly used for evaporating the water in flow 26. The product flow 28 coming from evaporator 27 goes to the soot-partial combustion gas separator 6, which is typically one or more cyclones. In this way the soot that has not been separated during the initial pass through the soot-partial combustion gas separator, 6, eventually still arrives in the soot combustion reactor, 11. The gas freed from solid particles leaves the scrubber reactor, 22, as product flow 29.

The product flow 28 still has a very high temperature. Before this gas is conducted to the scrubber, a large part of its heat content can be withdrawn from it in a heat exchanger, (not shown) and utilized for the production of steam.

What is claimed is:
1. A process for the production of a substantially soot-free, ash-free gaseous partial combustion product which comprises:
    1. partially combusting a hydrocarbonaceous fuel containing ash-forming components in a substantially void combustion zone by reaction between said fuel and an oxygen-containing gas to yield a crude gas product containing principally hydrogen, carbon monoxide, ash and between 5 and 15% soot;
    2. passing the crude gas product into a gas-solids separation zone wherein the solid soot particles and ash are separated by centrifugation and gravitation thereby affording a substantially soot-free partial combustion gas product and a solids consisting substantially of separated soot and ash components;
    3. passing said separated soot and ash to a soot combustion zone and burning said separated soot with between twofold and a fivefold excess of oxygen over that required for complete combustion of the soot in said soot combustion zone to yield a hot combustion gas containing as principal components, oxygen, carbon dioxide, ash and water;
    4. passing said hot combustion gas through a second gas-solids separation zone whereby the ash contained in said gas is separated from the hot combustion gas; and
    5. passing the ash-free hot combustion gas from the soot combustion zone into the partial combustion zone whereby the oxygen contained therein supplies at least a part of the oxygen requirements for partial combustion and substantial portions of the carbon dioxide and water contained therein are converted to carbon monoxide and hydrogen.

2. The process of claim 1, wherein steam is also introduced into the soot combustion zone.

3. The process of claim 1, wherein the separated soot from the gas-solids separation zone is transported to the soot combustion zone by means of gas flow.

* * * * *